(12) United States Patent
Lee et al.

(10) Patent No.: US 11,153,388 B2
(45) Date of Patent: Oct. 19, 2021

(54) WORKFLOW ENGINE FRAMEWORK FOR CROSS-DOMAIN EXTENSION

(71) Applicant: Electronics and Telecommunications Research Institute, Daejeon (KR)

(72) Inventors: Yeon Hee Lee, Daejeon (KR); Hyun Joong Kang, Daejeon (KR); Young Min Kim, Daejeon (KR); Tae Hwan Kim, Daejeon (KR); Hyun Jae Kim, Daejeon (KR); Hoo Young Ahn, Daejeon (KR); Tae Wan You, Sejong-si (KR); Ho Sung Lee, Daejeon (KR); Wan Seon Lim, Daejeon (KR); Cheol Sig Pyo, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/095,610

(22) Filed: Nov. 11, 2020

(65) Prior Publication Data

US 2021/0144212 A1     May 13, 2021

(30) Foreign Application Priority Data

Nov. 12, 2019  (KR) .................. 10-2019-0144637
Sep. 25, 2020  (KR) .................. 10-2020-0124980
Nov. 9, 2020   (KR) .................. 10-2020-0148569

(51) Int. Cl.
  *H04L 29/08*      (2006.01)
  *G06N 20/00*      (2019.01)
(Continued)

(52) U.S. Cl.
  CPC .......... *H04L 67/125* (2013.01); *G06N 20/00* (2019.01); *G06Q 10/0631* (2013.01);
(Continued)

(58) Field of Classification Search
  CPC .... G06N 20/00; G06Q 10/0631; G06Q 10/06; G06Q 10/0633; H04L 63/08;
(Continued)

(56) References Cited

U.S. PATENT DOCUMENTS 9,798,523 B2     10/2017  Chau et al.
2007/0261018 A1*  11/2007  Sanghvi ................. G06Q 10/06
                                                    717/100
(Continued)

FOREIGN PATENT DOCUMENTS

KR   1020160146088 A    12/2016
KR     102009576 B1      8/2019
KR   1020200004234 A     1/2020

*Primary Examiner* — Le H Luu
(74) *Attorney, Agent, or Firm* — William Park & Associates Ltd.

(57) ABSTRACT

Provided is an engine container configured by a workflow engine framework for a cross-domain extension, including a plurality of operators configured to interwork with a plurality of representational state transfer (REST) application programming interfaces (APIs), respectively, a runner configured to sequentially call the plurality of operators according to a request from a client, and a controller configured to control an operation of the plurality of operators and the runner, wherein each operator operates in a pipeline manner to call a corresponding REST API using uniform resource locator (URL) information transferred from the runner and to transfer a processing result obtained by processing data provided through the corresponding called REST API to a next operator.

17 Claims, 17 Drawing Sheets

(51) Int. Cl.
  *H04L 29/06* (2006.01)
  *G06Q 10/06* (2012.01)
(52) U.S. Cl.
  CPC .......... *H04L 63/08* (2013.01); *H04L 63/0823* (2013.01); *H04L 67/2833* (2013.01)
(58) Field of Classification Search
  CPC .............. H04L 63/0823; H04L 67/125; H04L 67/2833; H04L 41/0893; G06F 11/203; G06F 11/2294; G06F 9/466
  See application file for complete search history.

(56) References Cited

U.S. PATENT DOCUMENTS

| | | | |
|---|---|---|---|
| 2011/0047150 A1* | 2/2011 | Wolf | G06F 11/2294 707/723 |
| 2012/0331342 A1* | 12/2012 | Behrendt | G06F 11/203 714/23 |
| 2018/0046947 A1* | 2/2018 | Clayton | G06Q 10/06 |
| 2018/0089602 A1* | 3/2018 | Elvira | G06Q 10/0633 |
| 2019/0114200 A1* | 4/2019 | Lee | G06Q 10/0631 |
| 2020/0014633 A1* | 1/2020 | You | H04L 41/0893 |
| 2021/0004393 A1* | 1/2021 | Miller | G06F 9/466 |

\* cited by examiner

WORKFLOW ENGINE FRAMEWORK FOR CROSS-DOMAIN EXTENSION

CROSS-REFERENCE TO RELATED APPLICATIONS

This application claims priority under 35 U.S.C. § 119 to Korean Patent Application No. 10-2019-0144637, filed on Nov. 12, 2019, Korean Patent Application No. 10-2020-0124980, filed on Sep. 25, 2020, and Korean Patent Application No. 10-2020-0148569, filed on Nov. 9, 2020, the disclosure of which is incorporated herein by reference in its entirety.

TECHNICAL FIELD

The present invention relates to a configuration of a workflow for fusing different business domains, destination domains, or spatial domains.

BACKGROUND

The smart manufacturing industry, which has recently attracted attention, is based on a cross-domain intelligence service that derives optimal results by linking different tasks or different purposes performed in different physical spaces.

In order to provide a cross-domain intelligence service, a workflow configuration which combines different spatial domains, different business domains, and/or different purpose domains and which is adaptive to changes in data generation status or environment is required.

In addition, an orchestration technology for organically executing and controlling different spatial domains, different business domains and/or different purpose domains is required.

SUMMARY

Accordingly, the present invention provides a system for configuring a workflow for cross-domain extension and an orchestration method thereof, capable of extending a workflow configured in one domain and commonly applying the extended workflow to different spatial domains, different business domains and/or different purpose domains.

The above-described objects, advantages, and features of the present invention, and methods of achieving the same will become apparent with reference to the embodiments described below in detail together with the accompanying drawings.

In one general aspect, an engine container, which is generated according to a workflow specification defined by a user in a workflow engine framework for a cross-domain extension (hereinafter, referred to as a workflow engine framework) executed by a computing device including a processor, provides a fusion intelligence service for fusing different services.

Specifically, the engine container includes: a plurality of operators configured to interwork with a plurality of representational state transfer (REST) application programming interfaces (APIs), respectively; a runner configured to sequentially call the plurality of operators according to a request from a client; and a controller configured to control an operation of the plurality of operators and the runner, wherein each operator operates in a pipeline manner to call a corresponding REST API using uniform resource locator (URL) information transferred from the runner and to transfer a processing result obtained by processing data provided through the corresponding called REST API to a next operator.

According to the present invention, a workflow between one or more physical spatial domains, one or more business domains, and one or more purpose domains may be defined, executed, and controlled by a unified workflow configuration method.

In addition, according to the present invention, in order to provide an intelligence service requiring smart production, manufacturing, and processing, a cooperative workflow between physical spatial domains, a workflow capable of fusing different tasks or different purpose domains, and a workflow adaptive to changes in data generation status or environment may be configured and an orchestration technology for executing/controlling the workflows is provided, thereby providing a wide range of intelligence services in various fields such as smart city, smart farm, smart public, etc.

Other features and aspects will be apparent from the following detailed description, the drawings, and the claims.

DETAILED DESCRIPTION OF EMBODIMENTS

While a specific structural or functional description with respect to embodiments according to the present invention disclosed in this specification is merely provided for the purpose of describing the embodiments of the present invention, there are various modifications capable of replacing the embodiments, and the present invention is not limited to the embodiments described in this specification.

Hereinafter, embodiments of the present invention will be described in detail. However, the present invention is not limited by these embodiments.

Figure 1:
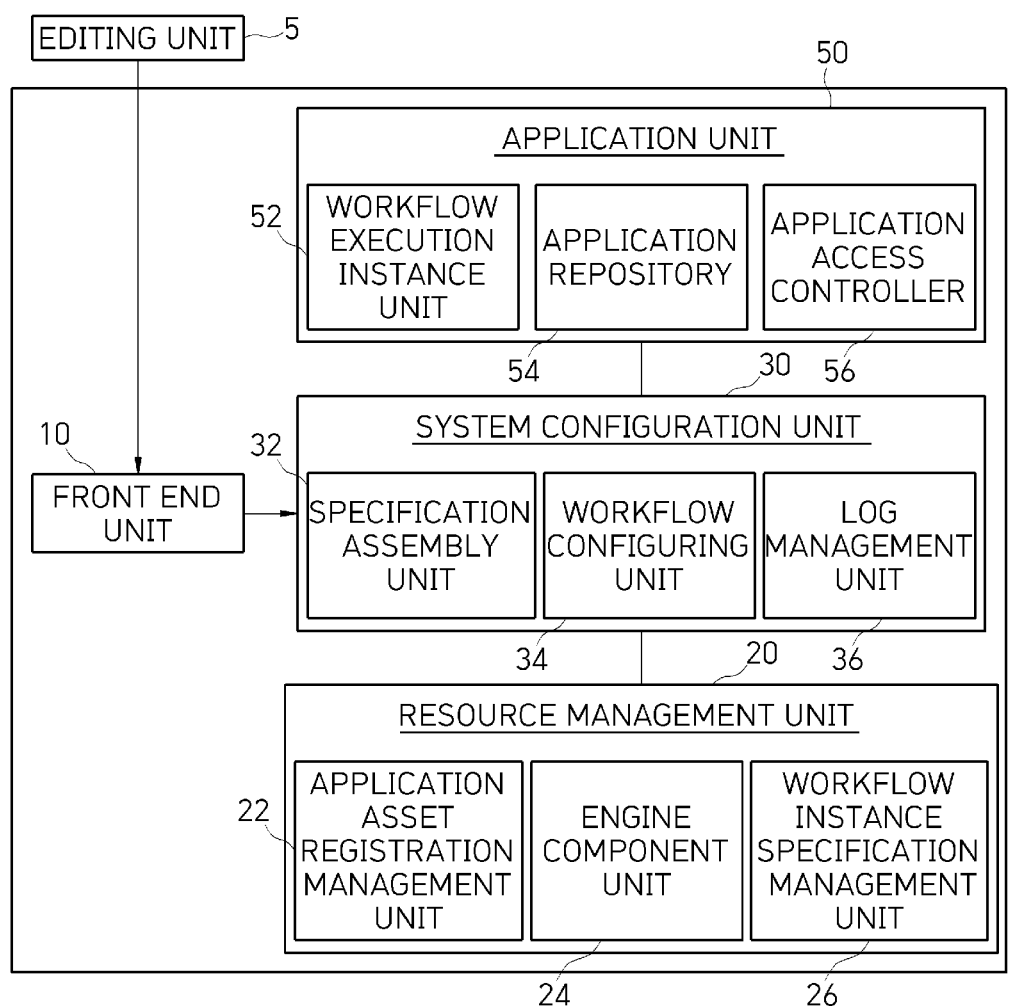
FIG. 1 is a block diagram illustrating components of a workflow engine framework for a cross-domain extension according to an embodiment of the present invention.

FIG. 1 is a block diagram of a workflow engine framework for a cross-domain extension according to an embodiment of the present invention.

Referring to FIG. 1, a workflow engine framework 100 for a cross-domain extension of the present invention may be implemented as a software module programmed or executed by a computing device equipped with a processor or a hardware module including such a software module.

The workflow engine framework 100 for a cross-domain extension (hereinafter, referred to as "engine framework") basically includes a front end unit 10, a resource management unit 20, a system configuration unit 30, a system controller 40, and an application unit 50. In FIG. 1, an editing unit 5 is further illustrated.

The editing unit 5 may be a software module that provides a function of creating a structure and specification of a task (workflow) to be executed or a hardware module including such a software module.

The front end unit 10 may be a software module that provides a function of delivering the structure of the work (workflow) and the specifications of the work (workflow) created by the editing unit 5 to the engine framework 100 or a hardware module including the software module.

The resource management unit 20 may be a software module providing a function of registering, maintaining, and managing various resources required to define a workflow or a hardware module including such a software module.

Resources necessary for defining a workflow may include a property specification component related to properties for defining each engine component on a workflow specification (a specification including one or more engines configuring a workflow) to be created by a user through the editing unit 10, an engine component corresponding to a component of an engine to perform a workflow execution, and a previously created workflow specification instance.

The system configuration unit 30 may be a software module providing a function of assembling a workflow property specification, dynamically assembling engine components required for the workflow execution, and creating an engine instance (hereinafter, used with 'engine' together) that performs the workflow or a hardware module including the same.

The system controller 40 is a software module that provides a function of controlling execution of the engine generated by the resource management unit 20, the system configuration unit 30, the application unit 50, and the system configuration unit 30 or a hardware module including the same.

The system configuration unit 30 and the system controller 40 may be integrated into one module, and here, the integrated unit may be referred to as an 'operation controller' or an 'orchestration unit'.

The application unit 50 may be a software module providing a function of managing engine instances created to execute the workflow specification created through the editing unit 5, storing data collected or processed according to execution of the engine instances, and controlling access to the stored data or a hardware module including the same.

In the workflow engine framework 100, a user defines a workflow including one or more engines to create a desired system. Here, the workflow includes definitions for one or more engines.

The definition of the engine may be a combination of an engine component container for containing engine components and an engine component to be contained in the engine component container.

The engine component container may be a combination of one or more reader components, writer components, runner components, operator components, and controller components.

At least one of the reader component, the writer component, the runner component, the operator component, and the controller component are created as a combination of a property specification component for defining properties representing properties of each component and an execution component corresponding to an actual implementation of the components.

The execution component corresponds to, for example, a class such as Java, C++, and the like, and the property specification component corresponds to a creator parameter that may be included in the creator of the class or a class containing the creator parameter.

In the present invention, a workflow for one or more engines generated in this manner is defined, whereby a workflow fused between different tasks or/and different purpose domains and a workflow adaptive to changes in data generation state or environment may be configured.

Hereinafter, each of the components shown in FIG. 1 will be described in more detail.

The editing unit 5 defines a detailed domain for a desired task and a task structure (workflow structure) to be processed for each domain.

In addition, the editing unit 5 defines a workflow execution flow by selecting engine component(s) according to a defined work structure and provides a function of creating a specification (work specification or workflow specification) of each engine component.

To this end, the editing unit 5 may inquire the framework (in particular, resource management unit 20) about a property specification component and an engine component).

Here, the 'work structure' may be, for example, a structured process of data collection, data processing, and learning from a specific IoT platform, and sequentially processing them may correspond to a workflow execution flow.

'Specification of components (work specification or workflow specification)' refer to specific definitions for each element component such as from which device data is to be collected, what's a data connection method, where received data is to be placed in a memory or a repository, where a repository location is, and the like, to perform an operation on from which data is to be brought, which process is to be performed, and where the data is to be output.

Users (data scientists, model developers, business developers, etc.), through the editing unit 5, may define a property specification component for defining an engine component constituting a workflow and parameters determining characteristics of the engine component according to a regulation and define and edit a pair of component and property specification.

Figure 2:
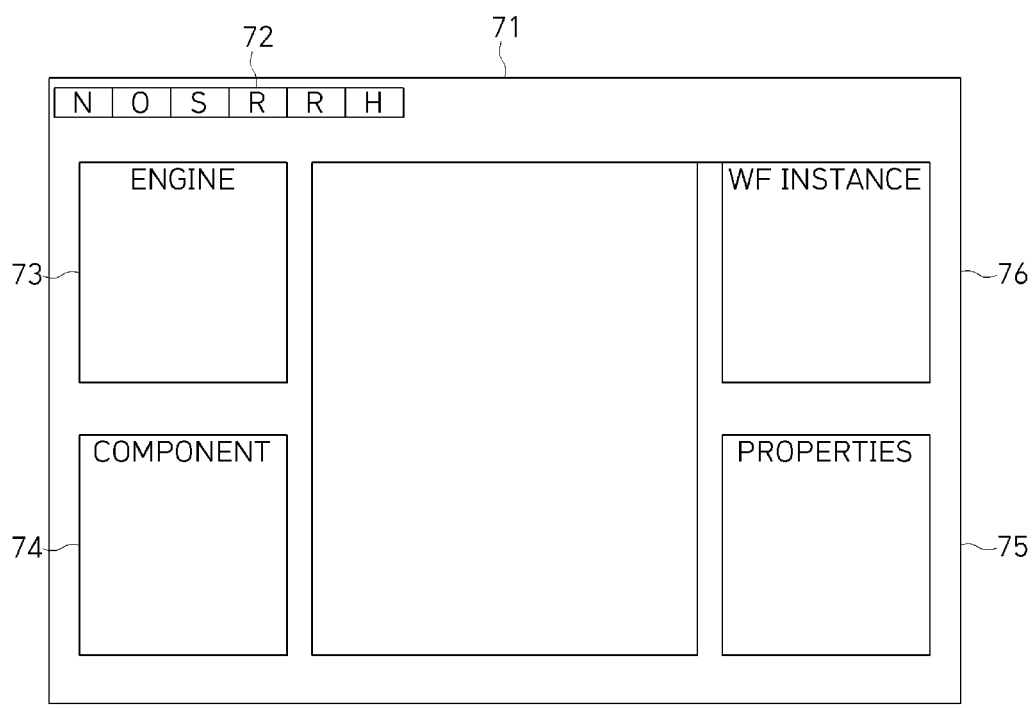
FIG. 2 is a diagram illustrating a GUI screen illustrating a configuration of an editing unit shown in FIG. 1.

An example of a GUI screen 71 illustrating a configuration of the editing unit 5 is shown in FIG. 2.

Referring to FIG. 2, a GUI screen 71 may include a function menu 72, an engine type selecting unit 73, a component selecting unit 74, a component property inquiry/editing unit 75, a workflow instance storage/checking unit 76.

The function menu 72 may include menus for selecting various functions that may be provided by the editing unit 5, for example, new (creating a new workflow), open (loading a saved workflow), and save (storing workflow), run (execute workflow), result (view execution result), and help.

The engine type selecting unit 73 presents various engine types and provides a function that enables a user to select necessary ones among them.

The engine type may include, for example, a real-time stream processing engine, a batch analysis engine, an on-demand data processing engine, an evaluation engine, a stream machine learning prediction engine, and a demand fusion serving engine.

The component selecting unit 74 provides a list of various engine components for each component type so that the user may select a component type and an engine component for each type. Table 1 below is an example of a component type and an engine component list presented by the component selecting unit 74.

TABLE 1

| Component type | Engine component |
| --- | --- |
| Reader | FileReader |
|  | HttpServerReader |
|  | Kafka Reader |
|  | MongodbReader |
|  | . . . |
| Writer | FileWriter |
|  | KafkaWriter |
|  | MongodbReader |
|  | . . . |
| Controller | SparkSessionController |
|  | SparkSessionStreamController |
|  | . . . |
| Runner | SparkRunner |
|  | TensoflowRunner |
|  | . . . |
| Operator | MinMaxScaler |
|  | Aggregator |
|  | . . . |

The component property selecting/editing unit 75 presents properties of the engine component selected by the component selecting unit 74, and the user may inquire properties to select and edit them.

The workflow instance selecting unit 76 provides a function of displaying a list in which a previously produced workflow is stored. Among these, a workflow desired to be recycled may be selected and re-edited, or an execution request may be made to the framework 100 as it is. The unit of recycling may be the entire workflow or it may be reused for each single engine included in the workflow and used for editing or execution.

When a workflow specification file is created in the editing unit 5, the workflow specification file is submitted (input) to the system configuration unit 30 in the engine framework 100. Here, the front end unit 10 may serve to receive the workflow specification and transmit it to the system configuration unit 30.

The front end unit 10 serves to mediate the execution of a process according to a user request and serves to respond to various requests such as user management or storage management.

The front end 10 may be, for example, a system including a general application server, a web application server providing a web-based REST API, or a general socket communication-based listener module.

In some cases, the front end 77 may be executed on a network different from a back end constituting the editing unit 10 or the framework 100.

Referring back to FIG. 1, the resource management unit 20 in the engine framework 100 provides a function of registering, maintaining, and managing various resources required to define a workflow and a function of requiring a component required for execution of the workflow.

To this end, the resource management unit 20 includes an application asset registration management unit 22, an engine component unit 24, and a workflow instance specification management unit 26.

The application asset registration management unit 22 registers, maintains and manages resources or additional information to be used to configure the workflow.

Application assets managed by the application asset registration management unit 22 includes, for example, a dataset to be used for machine running or data analysis, a training code for training machine learning, a machine learning/deep learning prediction model or other prediction algorithm generated through training, an algorithm implemented in a specific language such as python, a container image, a service API existing inside or outside, interworking platform information, information required for authentication on an interworking system, data source information, data subscription information, and the like.

The engine component unit 24 provides a space in which a property specification component and an engine component managed by the resource management unit 20 are physically or virtually stored.

The workflow instance specification management unit 26 manages a previously created and stored workflow specification instance. The workflow specification instance management unit 26 stores and manages a workflow specification instance to be used later at the request of the editing unit 5 (for example, through the workflow instance selecting unit 76 of FIG. 2).

Although not shown in the drawings, the resource management unit 20 may further include a property specification component management unit for managing (including updating) property specification components including property specifications that determine component properties or attributes of the workflow instance and a list thereof and an engine component management unit for managing (including updating) components (engine components) for execution and a list thereof.

The system configuration unit 30 provides a function of generating a component necessary for execution of the created workflow. The system configuration unit 30 generates an engine instance by configuring engine component containers according to a work structure (workflow structure) and work specification (workflow specification) input from the front end 10.

To this end, the system configuration unit 30 includes a workflow configuration unit 34 and a log management unit 36.

The workflow configuration unit 34 configures a series of engine components through a process of binding a work structure (workflow structure) received from the editing unit 5 through the front end unit 10 and property specification component and engine component corresponding to the work specification (workflow specification) based on the resources managed by the resource management unit 20 and configures a workflow execution platform based on the series of engine components.

The property specification component bound to the engine component includes, for example. Google's Protobuf message object, Scala's case class, Java's attribute object, and the like.

The workflow configuration unit 34 dynamically configures a workflow execution instance unit 52 including a series of engine instances for executing a workflow by binding an instance of engine components generated by binding an engine component constituting the workflow and a property specification component that defines parameters determining the characteristics of the engine component to the engine container.

The engine created to execute one workflow is distributed to and executed on another computing device connected via a network as one independent program package.

The log management unit 36 manages log information generated according to execution of the engine constituting the workflow and provides the same to a requestor.

The system controller 40 drives engine instances (engines) generated by the system configuration unit 30 and also serves to terminate the driven engine instances (engines). That is, when the system controller 40 requests the workflow execution instance unit 52 to execute the workflow, the workflow is executed.

In addition, the system controller 40 may control a specific engine generated to be executed in a specific domain and an engine generated to be executed in another specific domain to be executed in a pipeline manner. This engine configuration will be described in detail below.

The application unit 50 includes a workflow execution instance unit 52, an application repository 54, and an application access controller 56.

The workflow execution instance unit 52 is configured to include instances created to execute a workflow specification defined through the editing unit 5.

The application repository 54 provides a service for storing collected or processed data on a workflow. Here, the application repository 54 may be in or outside a specific domain.

The application access controller 56 controls access of engines constituting workflows of different domains to the application repository 54.

The engine framework 100 according to the present invention may configure a cross domain extension workflow that may be commonly applied to different spatial domains, differential work domains, or different purpose domains by extending a configuration and procedure of a workflow configured in one domain using the application repository 54 and the application access controller 56. An example of the configuration of the workflow for cross-domain extension using the application repository 54 and the application access controller 56 will be described in detail below.

In addition, the workflow engine framework 100 according to the present invention provides a method of configuring and executing a workflow for achieving one object through cooperation of a code node, one or more layer nodes such as cloud, a plurality of edge nodes of the same layer, or nodes of a group including code nodes.

In addition, the workflow engine framework 100 according to the present invention may configure and execute a workflow for achieving an adaptive intelligence service workflow execution such as periodic machine learning model tuning and serving model update.

In addition, the workflow engine framework 100 according to the present invention may configure and execute a workflow for a service pipeline for generating a complex API by connecting one or more APIs.

Hereinafter, an engine configuration (engine container configuration) for configuring a workflow for a cross-domain extension according to an embodiment of the present invention will be described.

Figure 3:
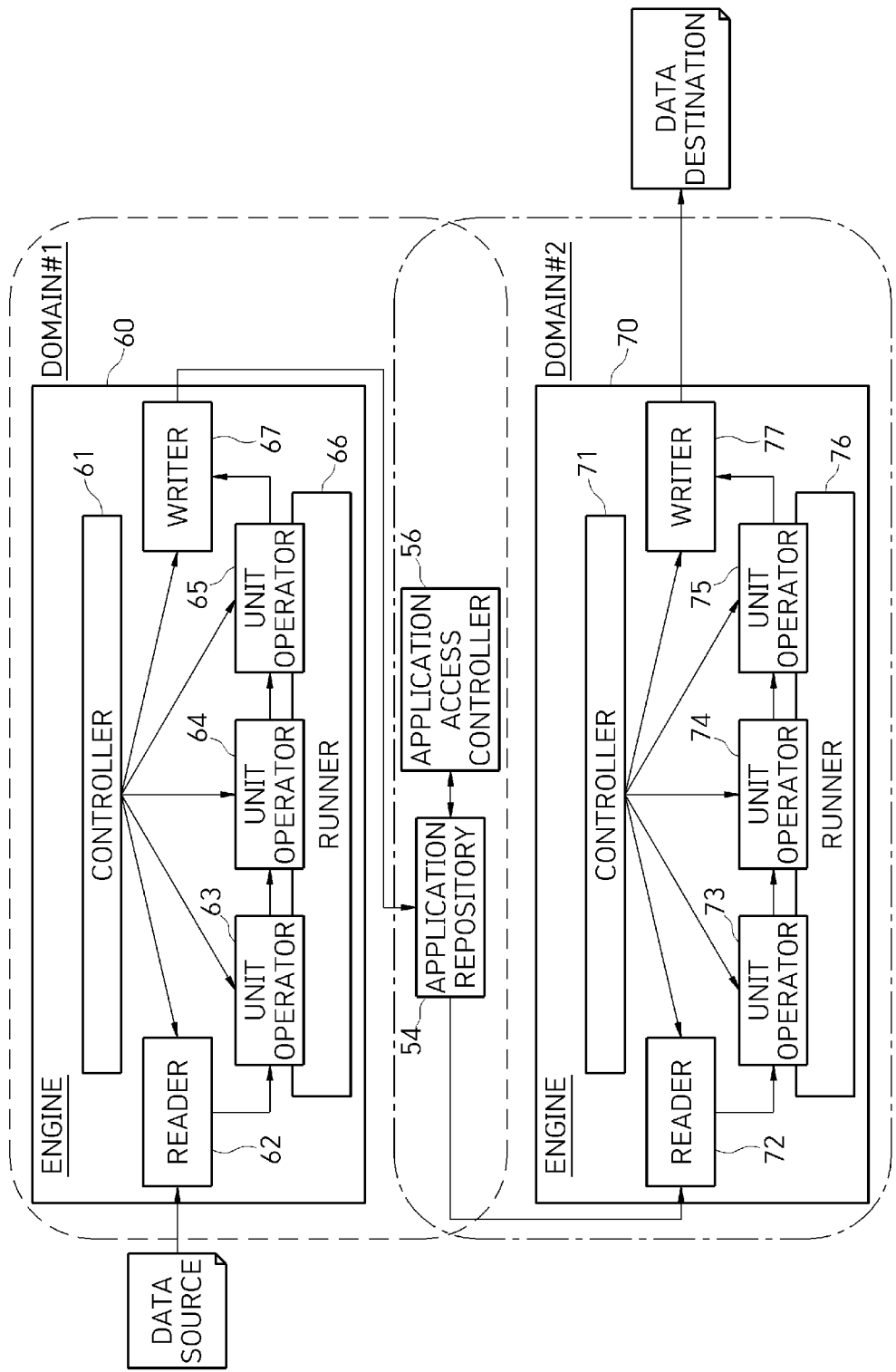
FIG. 3 is a block diagram of an engine for executing a workflow for a cross-domain extension according to an embodiment of the present invention.

FIG. 3 is a block diagram of an engine for configuring a workflow for cross-domain extension according to an embodiment of the present invention.

Referring to FIG. 3, in order to configure a workflow for a cross-domain extension according to an embodiment, the application repository 54 and the application access controller 56 shown in FIG. 1 are used.

A first engine 60 configures (executes) a first workflow of domain #1, and a second engine 70 configures (executes) a second workflow of domain #2.

The first engine 60 is a controller 61, a reader 62, a plurality of unit operators 63, 64 and 65, a runner 66, and a writer 67. The second engine 70 includes a controller 71, a reader 72, a plurality of unit operators 73, 74 and 75, a runner 76, and a writer 77.

The readers 62 and 72 have a function of reading data from a data source under the control of the controller 61. Here, the data source may be a source of various logical driver concepts such as in-memory buffer/cache, file system, messaging system, database, and network.

The writers 67 and 77 have a function of writing data to a data destination (not shown) of any one type of in-memory buffer, cache memory, file system, messaging system, database, and network driver.

The plurality of unit operators 63, 64, and 65/73, 74 and 75 are dependently connected, and operate data read by the reader 62 from the data repository in a pipelining manner. Here, data processing performed by each unit operator includes, for example, data refining, integration, reduction and/or conversion processing. The data processing processes such as refining, integration, reduction and conversion are introduced in detail in data mining technology, and descriptions thereof are replaced by known technologies.

The runners 66 and 76 may be all programs or external platforms/frameworks required for data processing. The runner 66 or 76 is, for example, Spark for big data processing, Caffe for deep learning analysis, a deep learning platform such as Tensorflow, a connector for interworking with or executing one of knowledge processing engines such as Jena or may be a REST server or a session manager.

The controller 61 or 71 controls the reader 62 or 72, a plurality of unit operators 63, 64 and 65 or 73, 74 and 75, a runner 66 or 76, and a writer 67 or 77.

As shown in FIG. 3, if each engine includes the reader 62 or 72, the plurality of unit operators 63, 64 and 65 or 73, 74 and 75, the runner 66 or 76, and the writer 67 or 77, the controller 61 or 77 may control the components in a sequential processing method in which data processed in each component is transferred to a next component according to the pipelining method, a simultaneous processing method in which data is simultaneously processed in each component, or a combination of the sequential processing method and simultaneous processing method.

The first engine 60 performs a first workflow of processing data read from a data source through the reader 62 and outputting the processed data to the application repository 54 through the writer 67. Here, the writer 67 has access rights and means to access the application repository 54.

The writer 67 may be assigned access rights to access the application repository 54 through authentication, and in order to be assigned the access rights, the writer 67 may utilize a token for accessing the application repository 54 based on an authentication method such as open authentication (OAuth) through an API.

The reader 72 of the second engine 70, like the writer 67 of the first engine 60, has the same access rights as tokens, and based on these access rights, the reader 72 may access the application repository 54.

The reader 72 of the second engine 70 reads data processed by the first engine 60 from the application repository 54, and a plurality of unit operators 73 of the second engine 70, 74 and 75 execute a second workflow of performing a data processing process on the data processed by the first engine 60 in a pipelining method and outputting a processing result to a data destination through the writer 77.

The application access controller 56 performs an authentication process on the first engine 60 or the writer 67 and the second engine 70 or the reader 72 and serves to assign access rights to the first engine 60 (or the writer 67) and the second engine 70 (or the reader 72) for the application repository 54 according to an authentication result.

As described above, in an embodiment of the present invention, in order to configure a workflow for a cross-domain extension, the first engine 60 constituting the first workflow of domain #1 and the second engine 70 constituting the second workflow of domain #2 are organically combined through the application repository (54 in FIG. 1), thereby executing the workflow in which different spatial domains, different business domains and/or different purpose domains may be fused.

Hereinafter, a configuration of an engine (engine container) constituting a workflow for a cross-domain extension based on a file system according to another embodiment of the present invention will be described. To help understanding, a configuration of a single engine that moves, copies, and deletes data based on a file system will be described.

Figure 4:
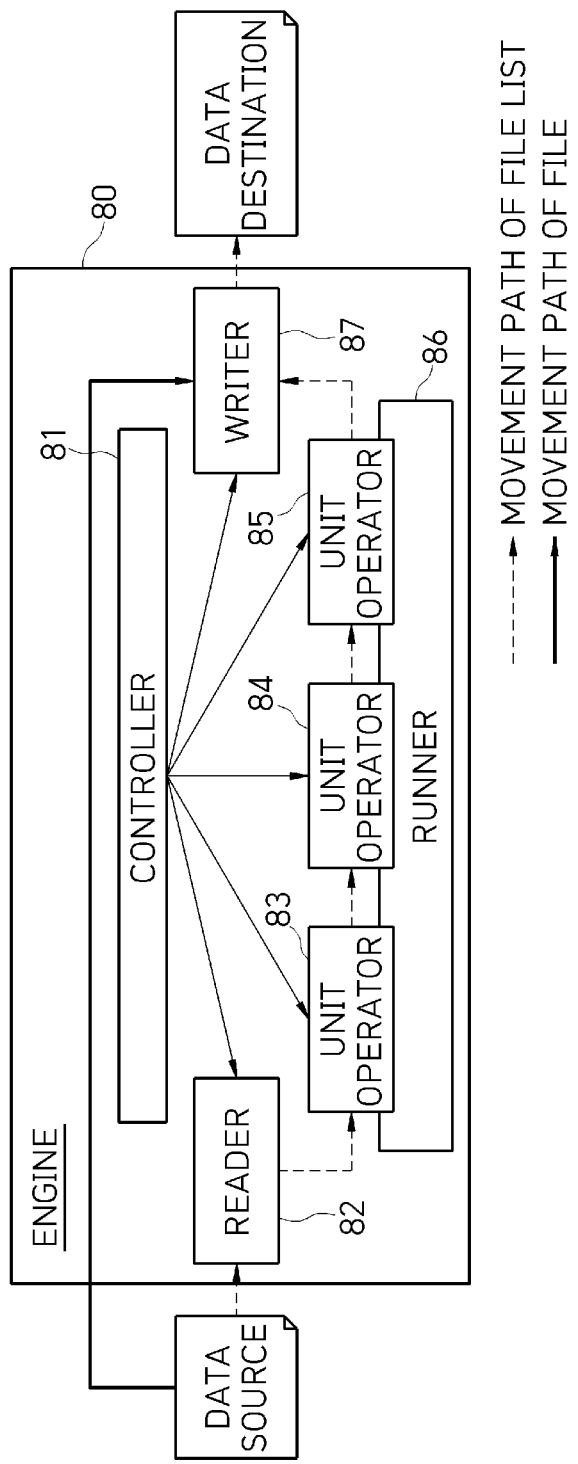
FIG. 4 is a diagram illustrating a configuration of a single engine based on a file system according to an embodiment of the present invention.

FIG. 4 is a diagram illustrating a configuration of a single engine based on a file system according to an embodiment of the present invention.

Referring to FIG. 4, a file system-based engine (or engine container) according to an embodiment of the present invention includes a controller 81, a reader 82, and a plurality of unit operators 83, 84 and 85, a runner 86, and a writer 87.

The reader 82 reads file lists from a data source under the control of the controller 81.

The unit operators 83, 84, 85 process the data processing process for the file list input from the reader 82 in a pipeline method, and then input the processed file lists to the writer 87.

For example, the unit operator 83 filters to select a file to be moved to a data destination from the list of files input from the reader 82, the unit operator 84 converts a file name of the file filtered by the unit operator 83 into a new file name, and the unit operator 85 changes different directory paths of files included in the file list processed by the unit operators 83 and 84 into the same directory path.

The writer 87 may be defined to have a function of moving or copying the file list processed by the unit operators 83, 84, and 85 and the files corresponding to the file list from the data source to the data destination according to the defined movement path.

In addition, the writer 87 may be defined to have a function of deleting the file list and the files corresponding to the file list processed by the unit operators 83, 84, and 85, without moving or copying the file list and the files from the data source to the data destination.

Figure 5:
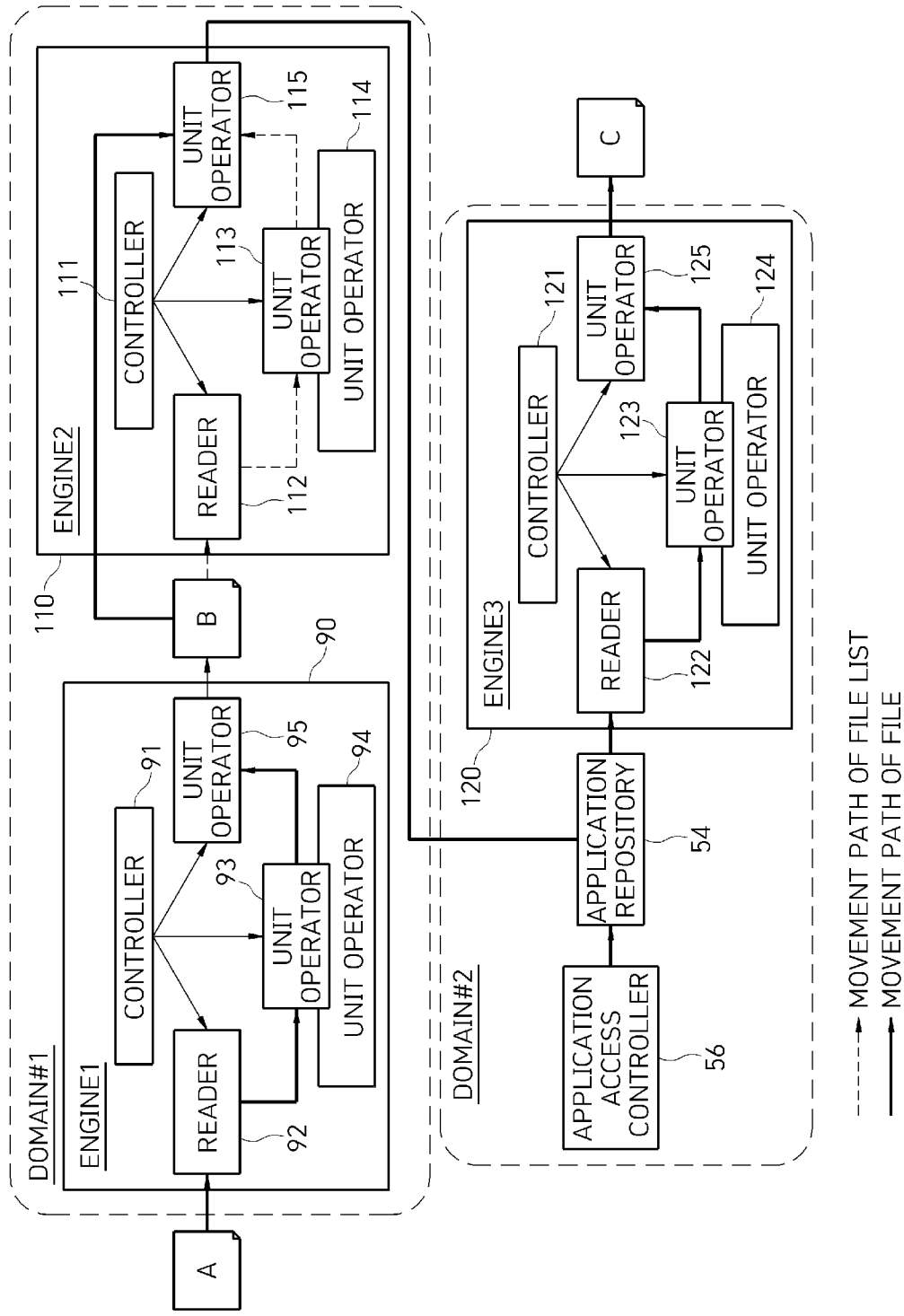
FIG. 5 is a block diagram of an engine for configuring a workflow for a cross-domain extension using a single engine configuration based on a file system shown in FIG. 4.
Figure 6:
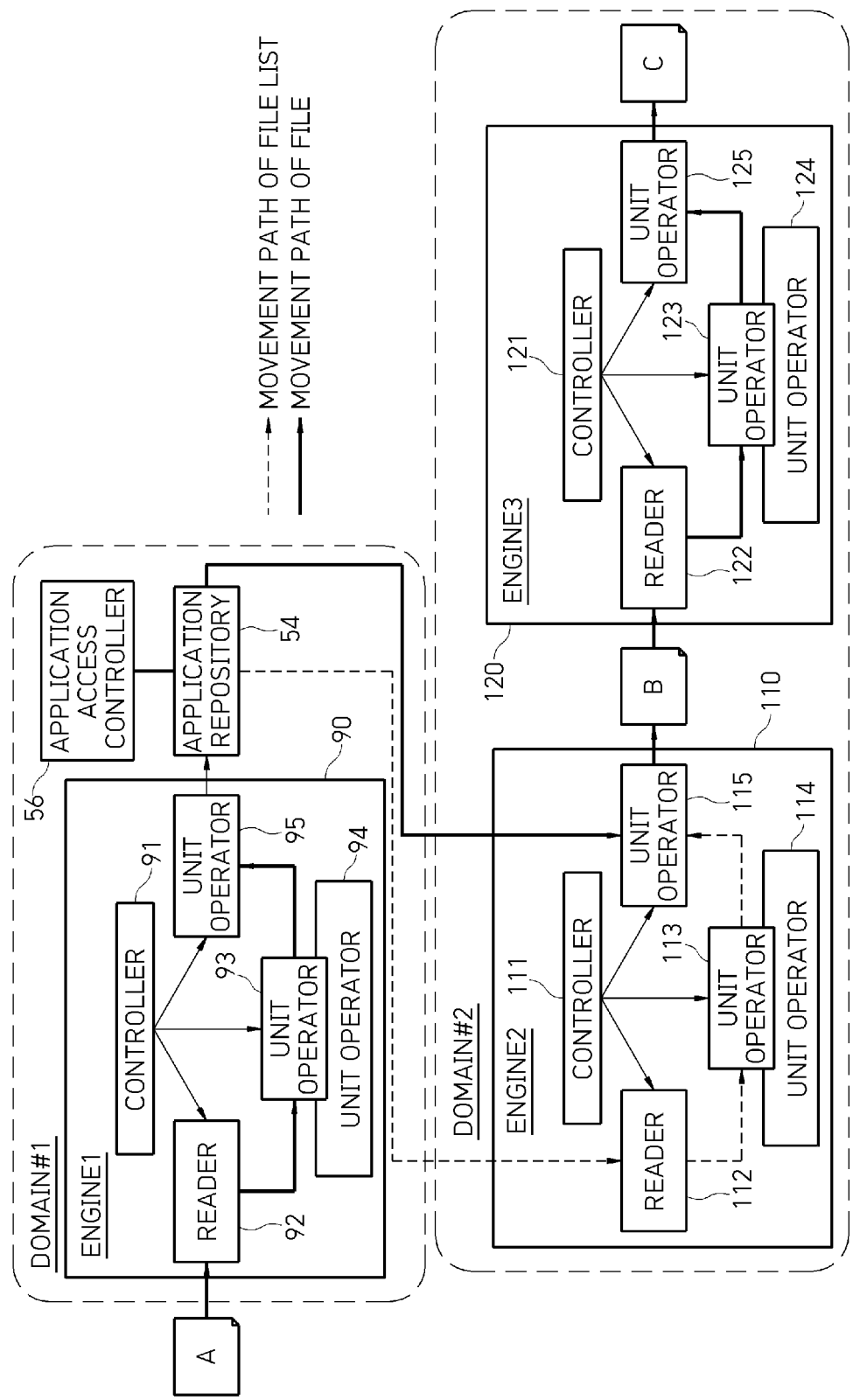
FIG. 6 is a block diagram of an engine illustrating another example of the configuration of the engine shown in FIG. 5.

FIG. 5 is a configuration diagram of an engine for configuring a workflow for a cross-domain extension using a single engine configuration based on a file system shown in FIG. 4, and FIG. 6 is a diagram illustrating another example of the engine configuration shown in FIG. 5.

First, referring to FIG. 5, the first and second engines 90 and 110 configures (executes or performs) a first workflow of domain #1, and the third engine 120 configures (executes or performs) a second workflow of domain #2 that defines a physical space different from domain #1. Here, the application repository 54 and the application access controller 56 are executed in domain #2.

The first to third engines 90, 110, and 120 includes controllers 91, 111, and 121, readers 92, 112, and 122, unit operators 93, 113, and 123, runners 94, 114, and 124, and a writer 95, respectively.

At least one of the first to third engines 90, 110, and 120 is configured as a single engine based on the file system shown in FIG. 4. That is, all of the first to third engines 90, 110, and 120 may be configured as a single engine based on a file system or only some of them may be configured as a single engine based on a file system. Of course, all of the first to third engines 90, 110, and 120 may be configured as a single engine 60 or 70 shown in FIG. 3.

In the engine configuration of FIG. 5, the second engine 110 is configured as a single engine based on a file system, and the first and third engines 90 and 120 are configured as a single engine 60 or 70 ('data-based single engine') shown in FIG. 3.

The description of the components included in the second engine 110 is replaced by the description of each component included in the single engine based on the file system of FIG. 4, and description of the components included in each of the first and third engines 90 and 120 is replaced by the description of each component included in the data-based single engine 60 or 70 illustrated in FIG. 3.

In addition, unlike the case of FIGS. 3 and 4, in FIG. 5, each engine includes only one unit operator 93, 113, or 123, but this is for simplification of the drawing and present invention is not limited thereto.

Hereinafter, for the fusion of the first workflow of domain #1 and the second workflow of domain #2, a method of transferring a processing result of the first workflow of domain #1 to domain #2 will be described.

First, the first engine 90 of the domain #1 performs a data processing process on the data (file list and file) read from the data source (A) and outputs processed data (file list and file) to an intermediate data destination (B).

Subsequently, the second engine 110 reads the file list from the intermediate data destination (B), extracts (filters) a file list to be transmitted to domain #2 from the read file list, and outputs the extracted file list to the application repository 54 executed in the second domain.

Here, the application access controller 56 of the domain #2 checks whether the writer 115 of the second engine 100 executed in the domain #1 has access rights to access the application repository 54. If it is verified that it has the access rights, the writer 115 of the second engine 110 accesses the application repository 54 and outputs a list of files (hereinafter, referred to as a processing result of the first workflow) extracted (filtered) by the unit operator to the application repository 54.

Then, the third engine 120 of domain #2 reads the processing result of the first workflow processed by the second engine from the application repository 54, performs a defined data processing process on the read processing result of the first workflow, and outputs the same to a final data destination (C).

Next, the engine configuration of FIG. 6 has the biggest difference from the engine configuration of FIG. 5 in that the application repository 54 and the application access controller 56 are executed in domain #1. In the following description, it is assumed that the writer of the first engine 90 and the reader 112 of the second engine 110 have access rights to the application repository 54.

Referring to FIG. 6, the first engine 90 of the domain #1 performs data processing process on the data (file list and file) read from the data source (A), accesses the application repository 54 of the domain #1, and outputs the processing result to the application repository 54.

Thereafter, the second engine 110 of the domain #2 accesses the application repository 54 of the domain #1 through the reader 112 and read the processing result processed by the first engine 90 from the application repository 54.

Thereafter, the second engine 110 extracts (filters) a required file list from among the file lists included in the processing result read from the application repository 54, and then moves or copies the extracted file list and the file into intermediate data destination (B).

Thereafter, the third engine 120 reads the data (file list and file) moved or copied to the intermediate data destination (B) through the reader 122, performs a data processing process in a determined manner through the unit operator 123, and subsequently outputs the same to the final data destination (C) through the writer 125.

Figure 7:
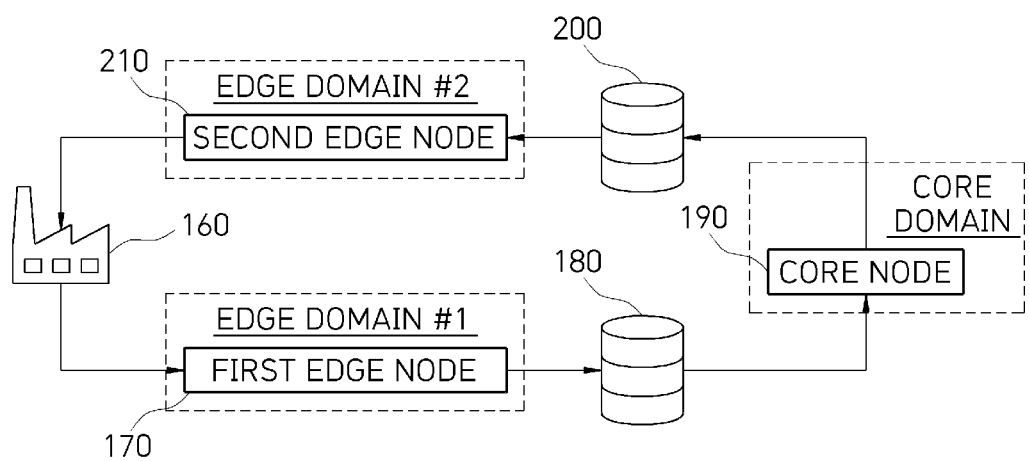
FIG. 7 is a diagram illustrating a method of providing a cooperative intelligence service based on a workflow for a cross-domain extension according to an embodiment of the present invention.

FIG. 7 is a diagram illustrating a method of providing a cooperative intelligence service based on a workflow for a cross-domain extension according to an embodiment of the present invention.

Referring to FIG. 7, a cooperative intelligence service according to an embodiment of the present invention is based on the engine configuration described in FIGS. 3 to 6, in which an edge domain and a core domain cooperate with each other to configure and execute a workflow for a cross-domain extension to achieve one purpose by cooperation.

In order to provide a cooperative intelligence service, a system environment in which a workflow engine framework that may configure and run the workflow of the edge domain #1, the workflow of the edge domain #2, and the workflow of the core domain is assumed.

The first edge node 170 of the edge domain #1 executes a workflow #1 for collecting and processing data from the data source 160. Here, the first edge node 170 may be referred to as an engine that executes the first workflow of the edge domain # in the first edge node 170.

The workflow #1 is configured as a file system-based engine of moving or copying the processing result (data file) to the shared repository 180 (or application repository) to share the engine processing the data collected from the data source 160 and the processing result (data file) with the core node 190 of the core domain.

The core node 190 of the core domain uses the processing result (data file) by the first edge node 170 from the shared repository 180 as training data to execute the workflow #2 to perform fine tuning for the learning model. Here, the core node 190 may be referred to as an engine that executes the workflow #2 of the core domain in the core node 190.

The workflow #2 includes an engine that reads the processing result (data file) of the workflow #1 from the shared repository 180 as training data, an engine that performs learning for fine tuning using the read training data (data file), and an engine that moves a new version of a learning model created (updated) according to the learning result to the shared repository 200.

The second edge node 210 of the edge domain #3 executes the workflow #3 of performing a prediction service using the new version of the learning model loaded from the shared repository 200. Here, the second edge node 210 may be referred to as an engine that executes the workflow #3 of the edge domain #3.

The workflow #3 includes an engine that moves the new version of the learning model from the shared repository 200 to the second edge node and a serving engine that performs serving to provide a prediction service using the new version of the learning model moved from the shared repository 200.

As such, it is possible to provide a cooperative intelligence service by performing a workflow in cooperation between the edge node and the core node.

Figure 8:
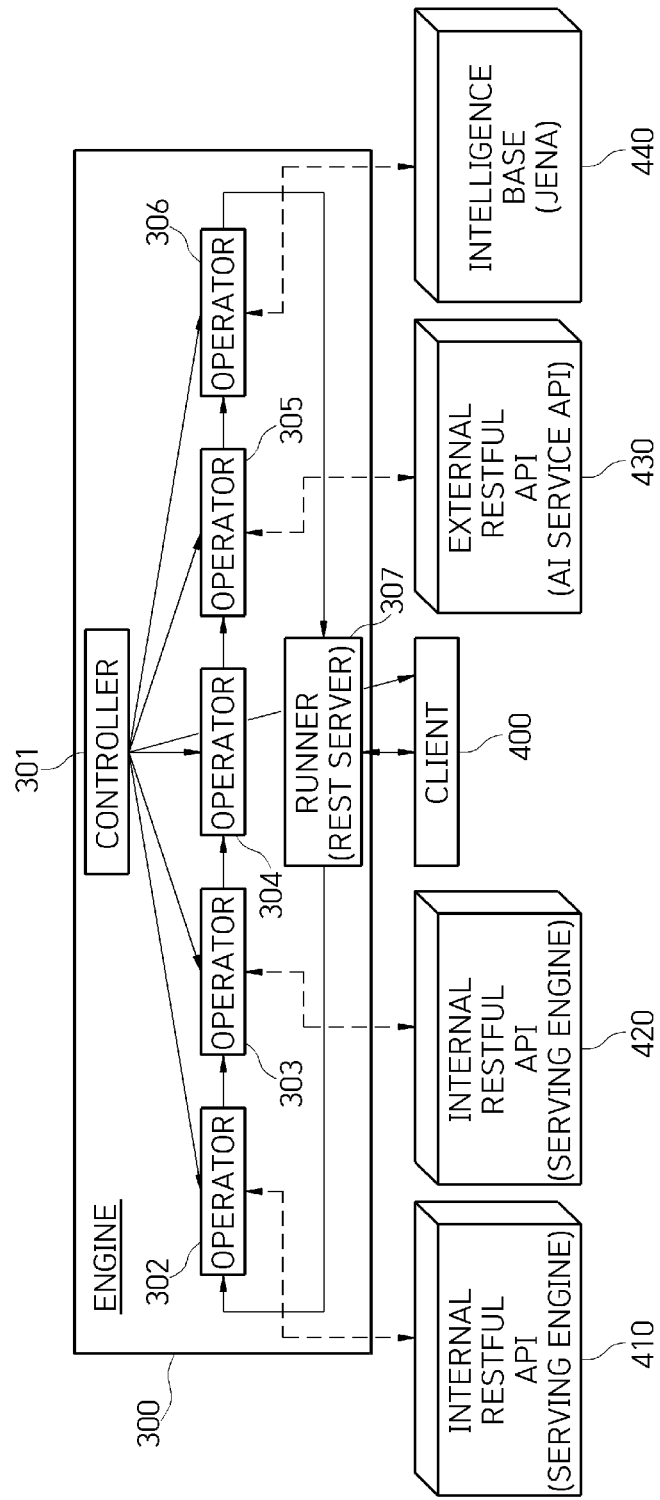
FIG. 8 is a block diagram of an engine (engine container) for defining a fusion intelligence service that combines services provided by different business and purpose domains according to an embodiment of the present invention.

FIG. 8 is a configuration of an engine (engine container, engine container system, or engine container device) for defining a fusion intelligence service in which services provided by different business and purpose domains are fused according to an embodiment of the present invention.

Referring to FIG. 8, an engine 300 for defining a fusion intelligence service that combines services provided by different business and purpose domains includes a controller 301, a plurality of operators 302-306, and a runner 307 and these components are similar to those described with reference to FIGS. 3 and 4.

However, the engine 300 of FIG. 8 is configured for a function of serving service execution in a workflow service, and in this sense, the engine 300 may be referred to as a serving engine.

The controller 301 controls the operation of a plurality of operators 302 to 306 and the runner 307.

A plurality of operators 302 to 306 interworks with a plurality of REST (Representational State Transfer) API (Application Programming Interface) 410 to 430 and a knowledge base 440. Each operator may be considered as a component similar to the unit operator illustrated in FIGS. 3 to 6. Here, the plurality of operators 302 to 306 may be performing data processing for providing different services according to different purpose domains.

The runner 307 may be a representational state transfer (REST) server or interwork with the REST server and sequentially calls the operators 302 to 306 at the request of the client 400.

In case of calling the runner 307, each operator operates in a pipeline manner to call corresponding REST API using uniform resource locator (URL) information transmitted from the runner 307 or URL information that each operator knows, process data provided through the called REST API, and transfer the processed data to a next operator.

A processing result of the final operator 306 is returned back to the client 400 through the runner 307.

Figure 9:
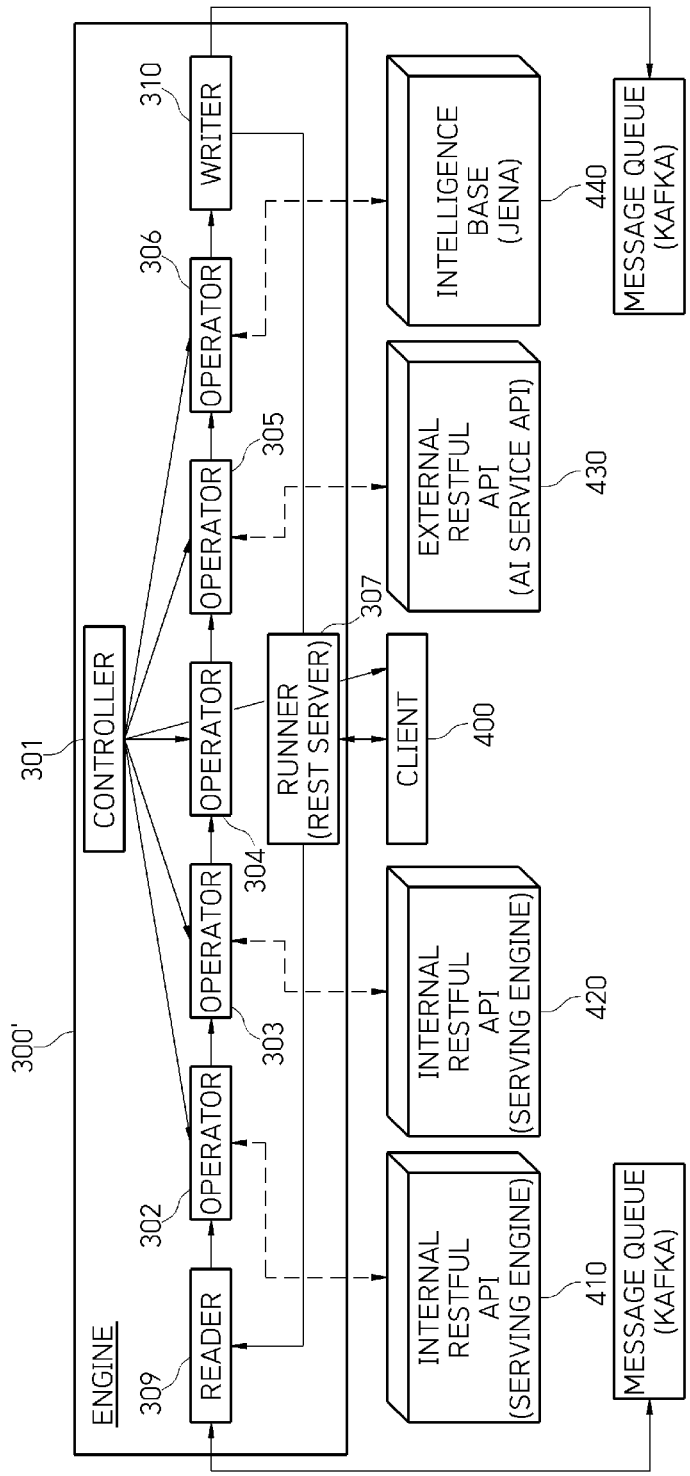
FIG. 9 is a block diagram of an engine (engine container) for defining a fusion intelligence service that combines services provided by different business and purpose domains according to another embodiment of the present invention.

FIG. 9 is a block diagram of an engine (engine container) for defining a fusion intelligence service in which services provided by different business and purpose domains are fused according to another embodiment of the present invention.

Referring to FIG. 9, an engine 300' according to another embodiment of the present invention is the same in configuration as the engine illustrated in FIG. 8, except that the engine 300' further includes a reader 309 and a writer 310.

The engine 300' may include, for example, a reader 309 that reads data from a message queue, Kafka, or the like, operators 302 to 306 that perform the read data in an ontology-based reasoning, a runner 307 that provides an inference result through a REST interface, and a writer 310 that outputs the inference result to the message queue, Kafka, or the like, thereby providing a fusion intelligence service.

FIGS. 10 to 14 are diagrams illustrating an internal processing procedure of an engine for the fusion intelligence service shown in FIGS. 8 and 9.

Figure 10:
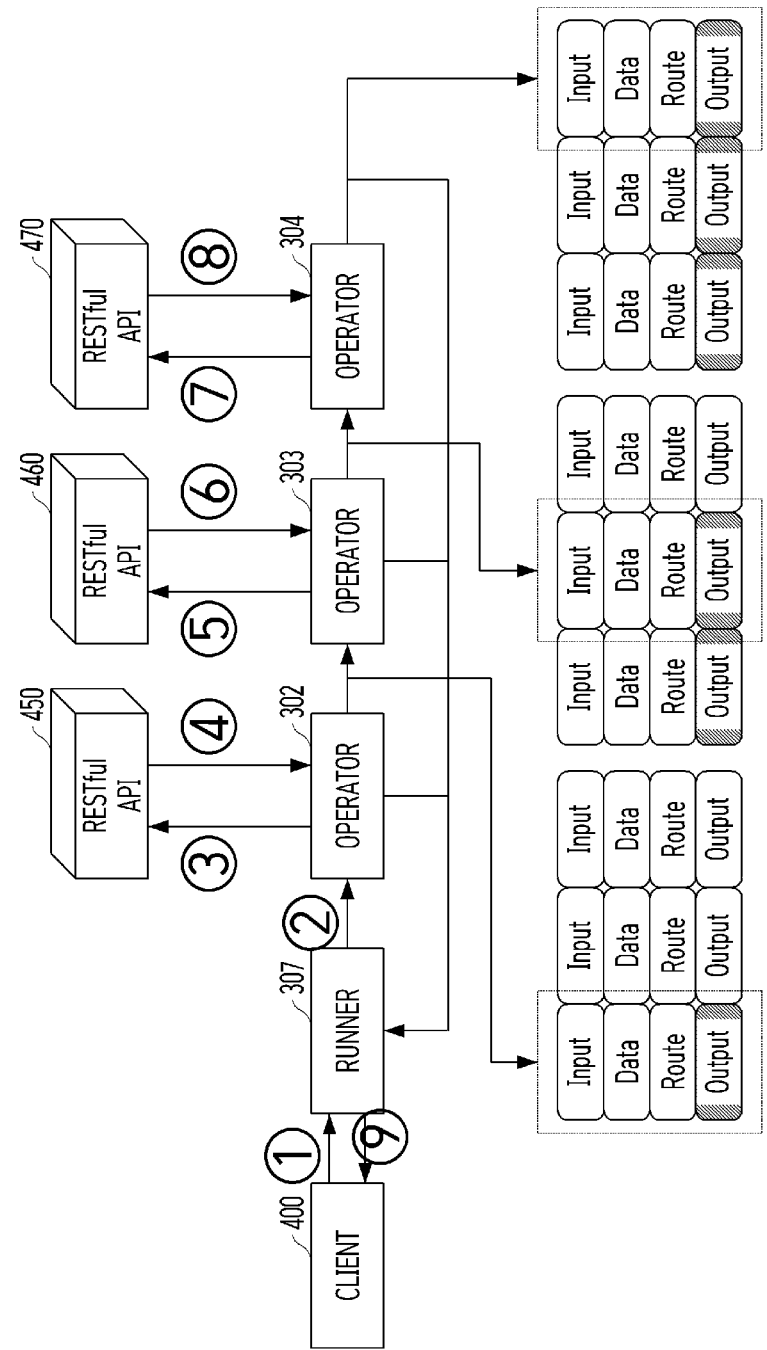
FIGS. 10 to 14 are diagrams illustrating an internal processing procedure of an engine for the fusion intelligence service shown in FIGS. 8 and 9.

First, the internal processing procedure of the engine for the fusion intelligence service of FIG. 10 is an internal processing procedure performed when the processing results of operators do not affect each other independently.

First, the runner 307 in the REST server calls a first operator 302 according to the fusion intelligence service request from a client 400 (②), and the called first operator 302 transfers query data to a corresponding RESTful API 450 (or an external server) (③), and receives response data from the RESTful API 450 (④).

The processing result of the first operator 302 includes a data format including an input field in which input parameters used for a query are recorded, a data field in which data is recorded, a route field in which routing information indicating a query address is recorded, and an output field in which the response data (④) is recorded.

The order of arranging these fields may be different for each operator, and the information recorded in the input field, data field, and route field may be used as main information of the query data.

When the first operator 302 completes a query/response procedure, the second operator 303 delivers query data (⑤) to the corresponding RESTful API 460, receives response data (⑥) from the RESTful API 460, and outputs a processing result reflecting the received response data.

When the second operator completes the query/response procedure, the third operator 304 delivers query data (⑦) to the RESTful API 470, receives response data (⑧) from the RESTful API 470, and outputs a processing result reflecting the received response data.

When the query/response procedure of all the operators 302, 303 and 304 is completed, the runner 307 collects the processing results output by each operator and returns the collected processing results to the client 400 (⑨).

Figure 11:
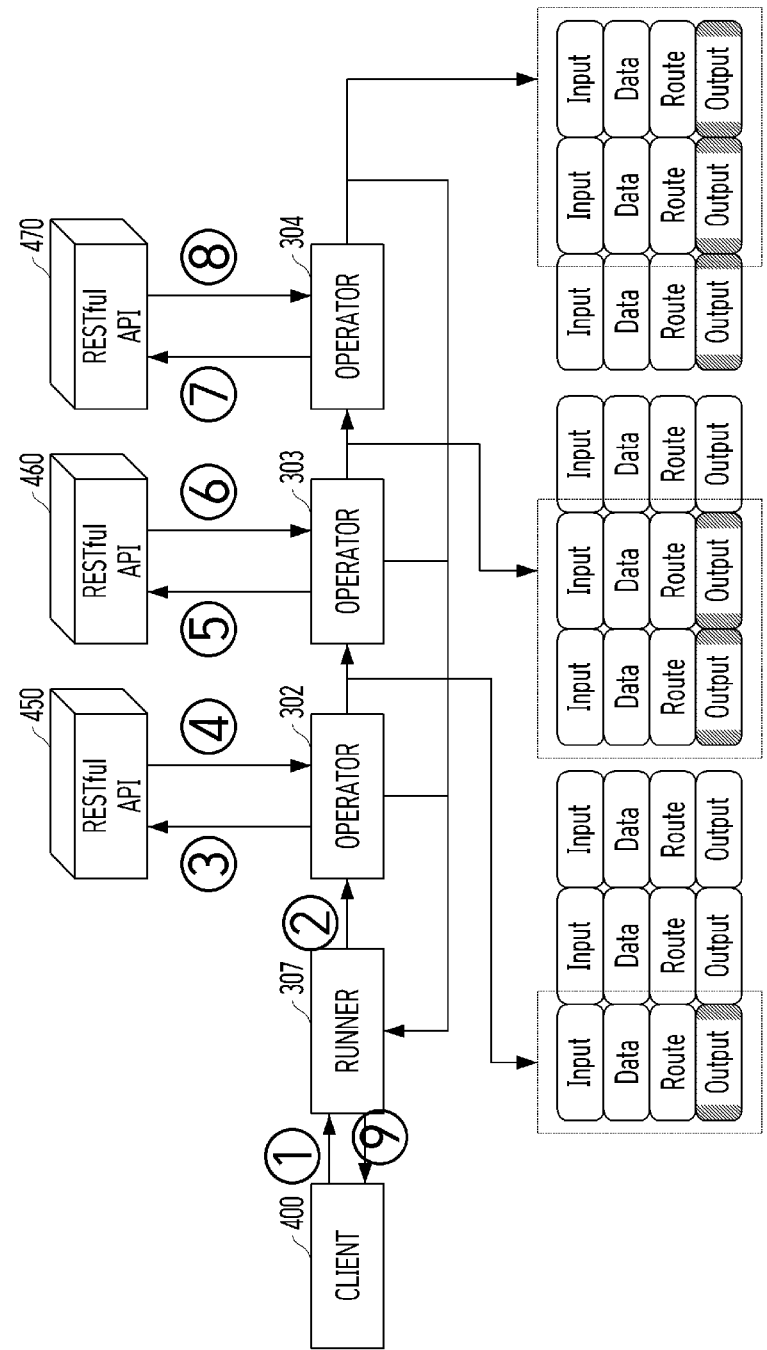

The internal processing procedure of the engine for providing the fusion intelligence service of FIG. 11 is different from the internal processing procedure shown in FIG. 10 in that it supports a chaining method in which each operator reflects the processing results of the previous operator in the query of its own.

Referring to FIG. 11, the first operator 302 called by the runner 307 according to the service request (①) of the client 400 includes input parameters, routing information, and data as query data and transfers the same to the corresponding RESTful API 450 (③).

The first operator 302 receives response data for the query data, records the response data in an output field of the query data, and updates the output field.

When the update of the output field is completed, the first operator 302 outputs a processing result include input parameters, routing information, and response data to the second operator 303.

The second operator 303 updates the query data of itself 303 using the processing result (input parameters, routing information, data, and response data of the RESTful API 450) output from the first operator 303. That is, the query data of the second operator 303 may be updated to include the processing result of the first operator 302.

Thereafter, the second operator 303 transmits the updated query data (⑤) of itself to the corresponding RESTful API 460 (or an external server), receives response data (⑥) for the updated query data (⑤) from the RESTful API 460, and updates the output field with the response data (⑥).

When the update of the output field is completed, the second operator 303 outputs the processing result to the third operator 304.

Similarly, the third operator 304 updates its query data using the query data included in the processing result input from the second operator 303, transfers the updated query data (⑦) to the corresponding RESTful API 470, receives response data (⑧) for the updated query data, and updates an output field with the response data.

When the update of the output field is completed, the third operator 304 transfers the processing result to the runner 307, and the runner 307 returns a final result (⑨) transmitted from the third operator 304 to the client.

Figure 12:
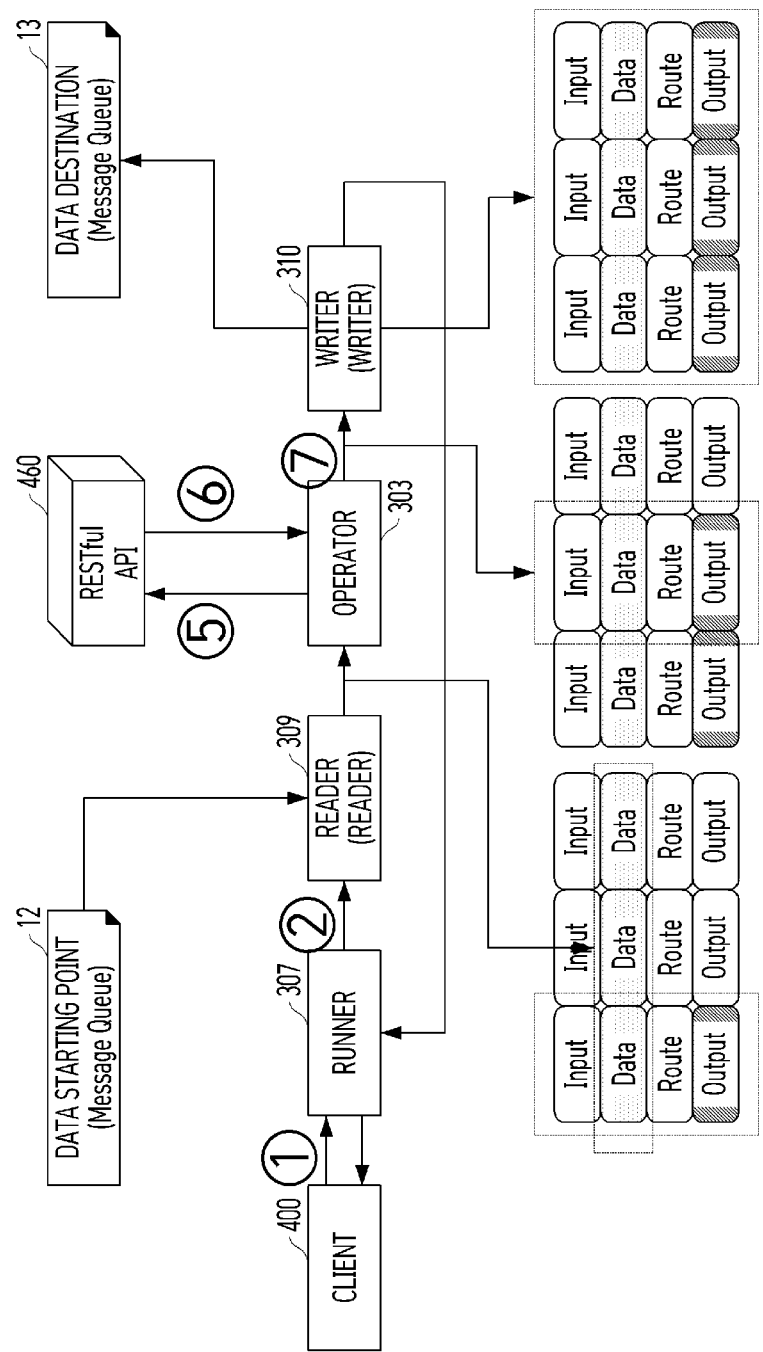

The internal processing procedure of the engine for providing the fusion intelligence service of FIG. 12 is an internal processing procedure performed in the case of further including a reader for reading a data field and a writer for outputting the processed data field.

A client 400 transmits a service request message including only the remaining data (Input/Route) excluding the actual data included in the query data to the runner 307 (①).

The runner 307 outputs the data (Input/Route) included in the service request message to the reader 309.

The reader 309 reads data from the data source 12 and updates the data field. Here, the data read from the data source 12 by the reader 309 may have an arrangement that specifies the data for each operator.

Next, the operator 303 generates query data including data read from the reader 309, delivers the generated query data to the RESTful API 460 (⑤), and receives response data for the query data from the RESTful API 460 (⑥).

After the query and response procedure of the operator 303 is completed, the operator 303 outputs a processing result including the query data and the response data to the writer 310 (⑦).

The writer 310 outputs a portion or the entirety of the processing result received from the operator 303 to the data destination 13.

Finally, the runner 307 transmits the processing result of the operator 303 received from the writer 310 to the client 400.

Figure 13:
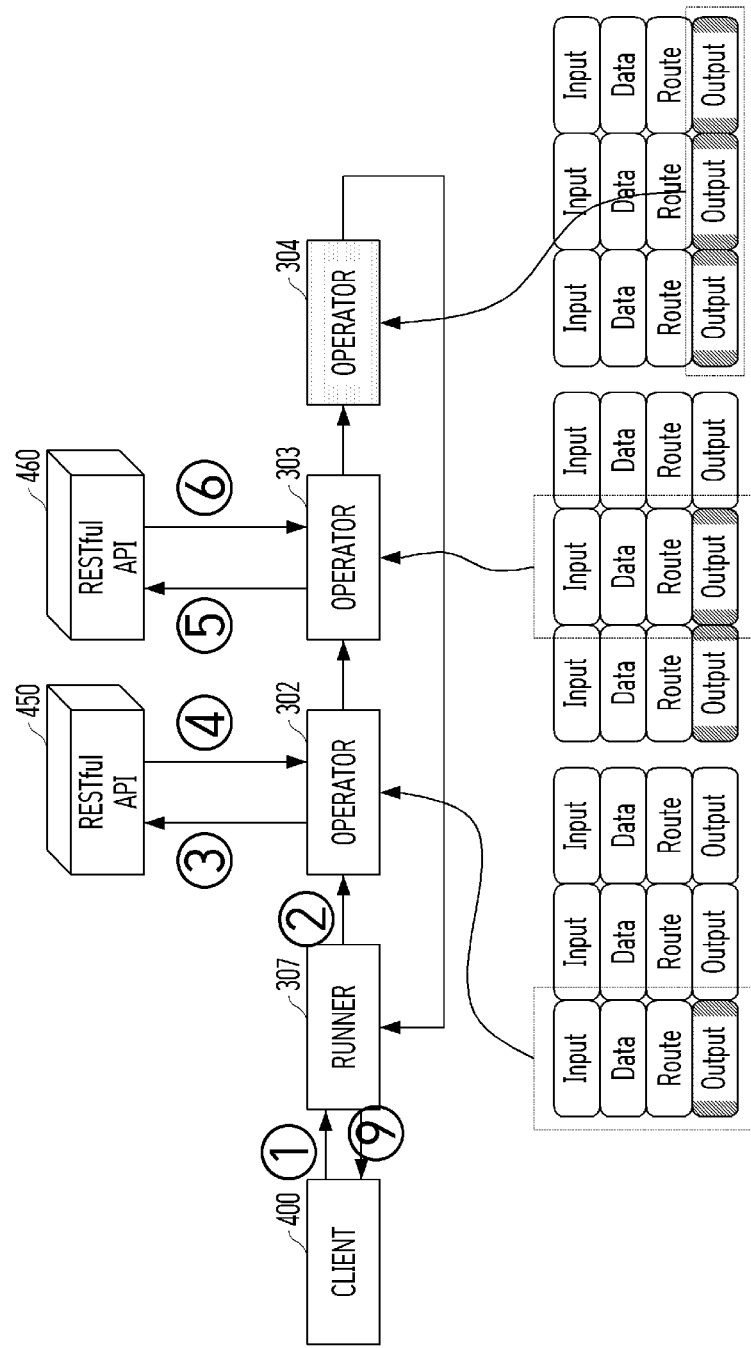

The internal processing procedure of the engine for providing the fusion intelligence service of FIG. 13 is an internal processing procedure when the last operator 304 performs a function of aggregating outputs.

According to the request (①) of the client, the runner 307 sequentially calls the operators 302, 303 (②), and the sequentially called operators 302, 303 transfers query data to the corresponding RESTful API 450 and 460 (③, ⑤).

Each operator receives the response data for the query data (④, ⑥) and updates the output field using the response data.

The last operator 304 having the output aggregation function uses aggregates the data (response data of 450 and 460 (④, ⑥)) included in the processing results of the previous operators 302 and 303 using an aggregation method (average, sum, And, Or, Min, Max, Percentile, etc.) defined as properties and updates the output field included in the processing result of itself 304 with the aggregation result.

The runner 307 returns the processing result aggregated by the last operator 304 to the client 400 (⑨).

Figure 14:
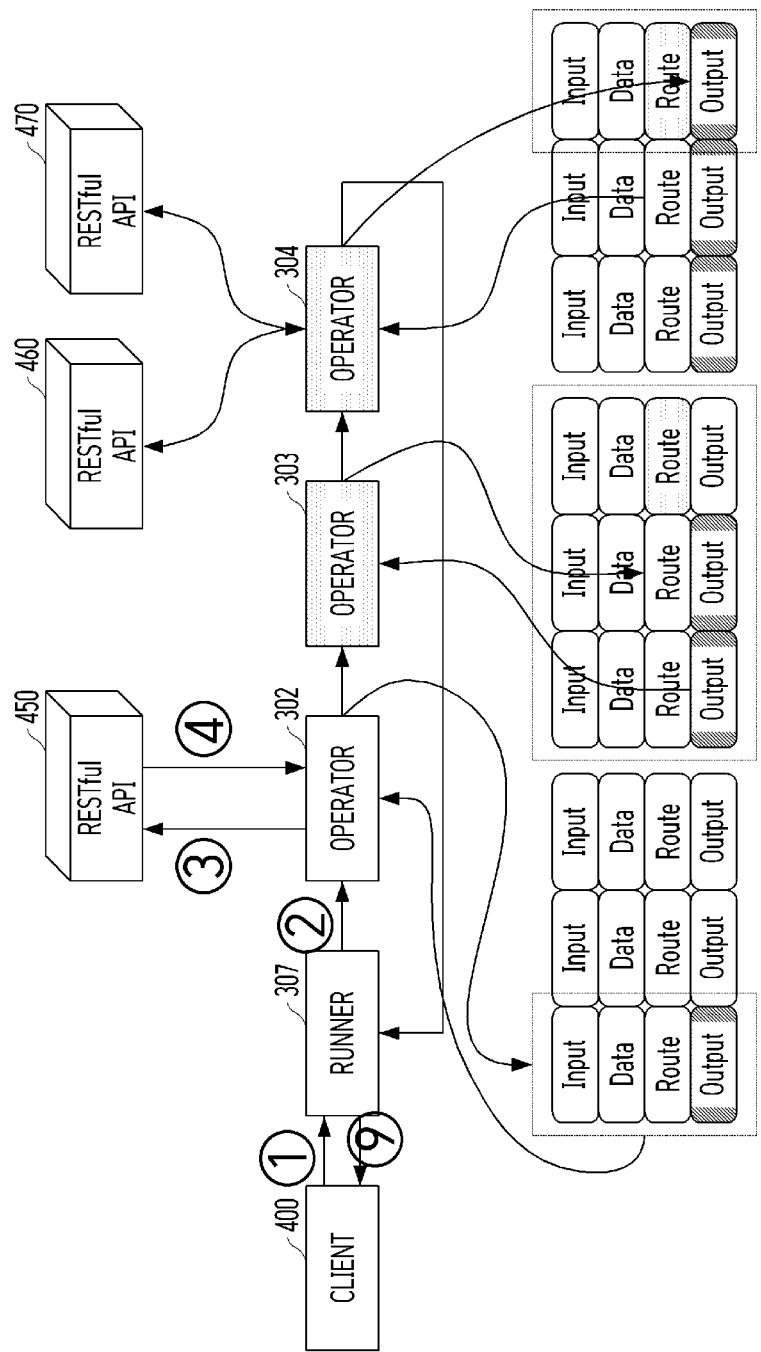

The internal processing procedure of the engine for providing the fusion intelligence service of FIG. 14 is an internal processing procedure in the case of including the operators 303 having a lookup table including Url information indicating a query address.

First, according to the client's request (①), the first operator 302 called by the runner 307 transmits query data to the corresponding API 450 (or external server), and the API 450 (or an external server) configures a processing result to include the response data ((④)) for the query data, and transmits the configured processing result to the second operator 303.

The second operator 303 has a lookup table for Uri and extracts a Uri value (or Uri information) mapped to the response data ((④)) recorded in the output field from the look-up table using the data (response data (④)) of 450) recorded in the output field configuring the processing result of the first operator 302.

Thereafter, the second operator 303 configures the processing result to include the Url value (or Url information) extracted from the lookup table and transmits the configured processing result to the third operator 304. Here, the Url value extracted by the second operator 303 using the lookup table is used for updating routing information of the third operator 304. That is, the third operator 304 transmits the query data of itself 304 to the external servers 460 and 470 indicated by the Url value extracted by the second operator 303.

The last operator 304 transmits the query data to the API 460 or 470 corresponding to the query address according to the routing information updated by the extracted URL, receives response data therefor, and transfers a processing result including the response data to the runner 307.

The runner 307 returns the processing result transmitted from the last operator 304 to the client 400 ((⑨)).

Figure 15:
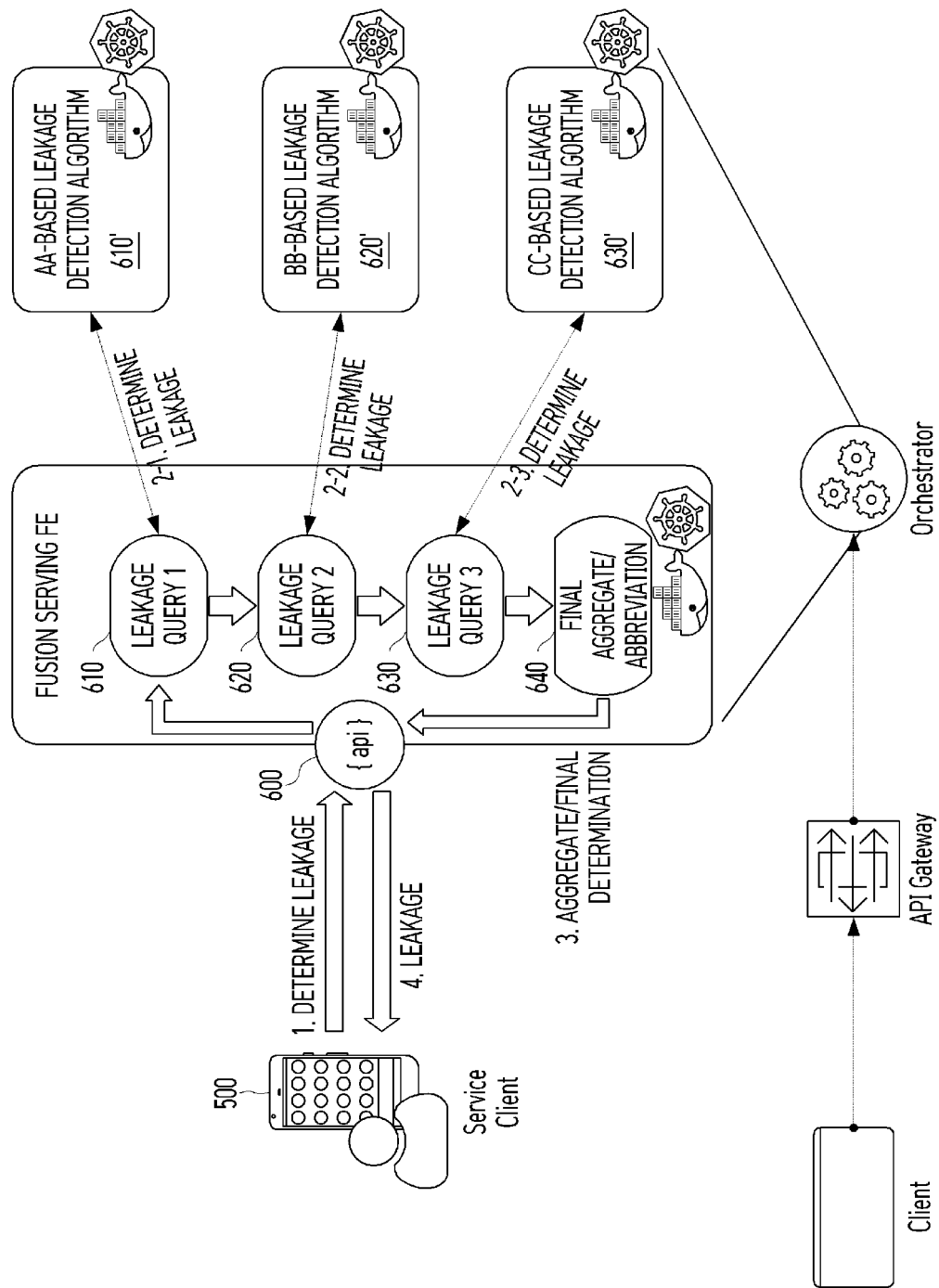
FIG. 15 is a diagram illustrating a workflow service scenario related to pipe leakage detection using an engine configuration including an operator having an aggregate function shown in FIG. 13.

FIG. 15 is a view illustrating a workflow service scenario related to pipe leakage detection using an engine configuration including an operator having an aggregate function shown in FIG. 13.

The workflow service scenario related to leak detection shown in FIG. 15 includes an engine that provides a response by configuring one or more intelligent APIs in an ensemble manner.

A service client 500 calls an API that predicts leakage by collecting an acoustic signal of a pipe, and a runner 600 serving the called API sequentially calls operators 610, 620, 630.

The operators 610, 620, and 630 called by the runner 600 configures query data related to the pipe leak and transmits the query data to external servers 710, 720, and 730, respectively.

External servers 610', 620', and 630' determine whether there is a leak using a predictive model such as a leak detection algorithm, configure response data for the determination result, and transfer the response data to the operators 610, 620, and 630, respectively.

The last operator 640 aggregates the processing results of the operators 610, 620, and 630, finally determines whether there is a pipe leak using the aggregation result, and returns the final determination result to the service client 500 through the runner 600.

Figure 16:
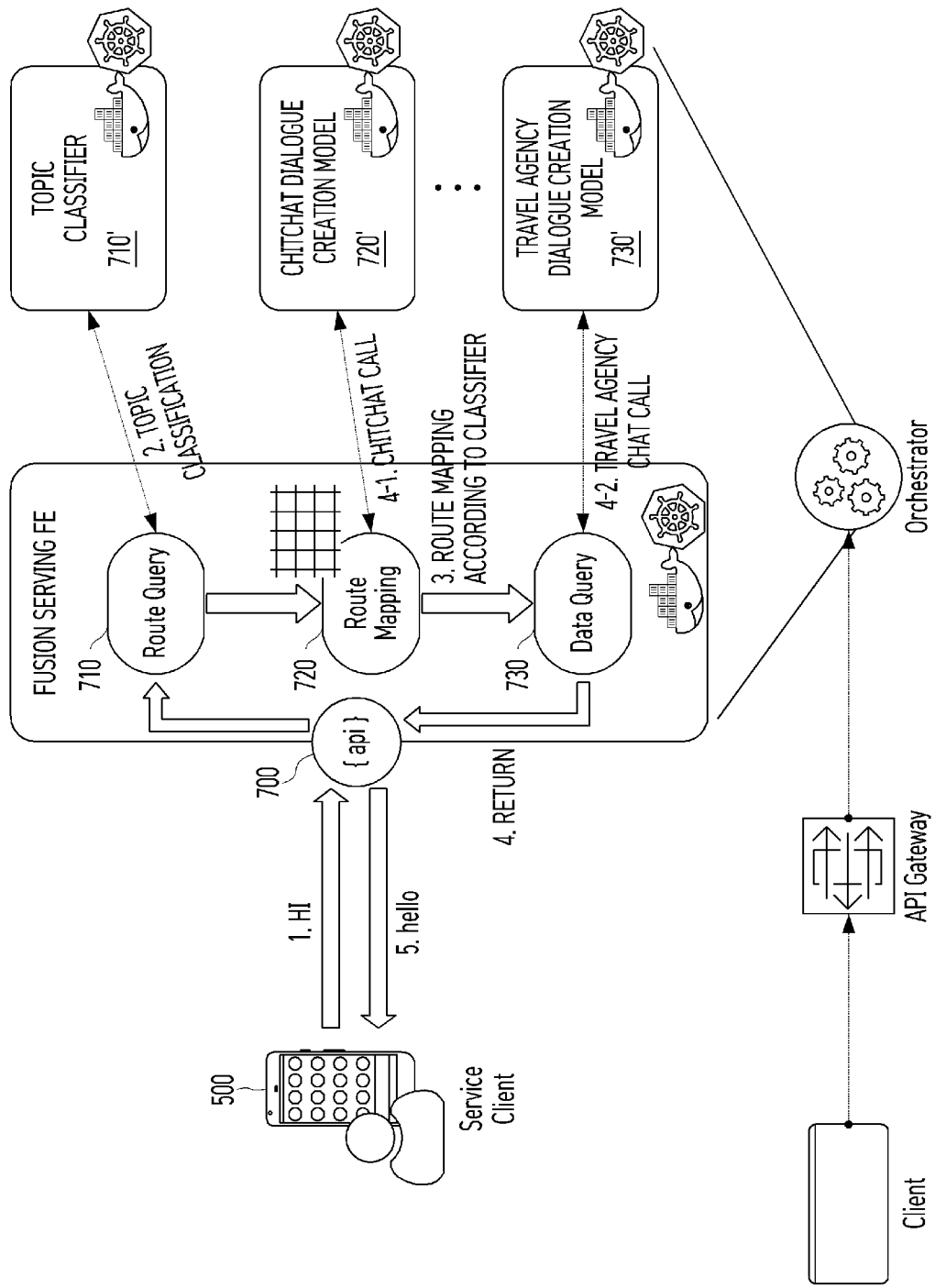
FIG. 16 is a diagram illustrating a workflow service scenario related to conversation creation using an engine configuration configured to include an operator having a lookup table shown in FIG. 14.

FIG. 16 is a view illustrating a workflow service scenario related to conversation creation using an engine configuration configured to include an operator having a lookup table shown in FIG. 14.

Referring to FIG. 16, the first operator 710 in the engine receives a sentence from the client 500 through the runner 700, generates query data requesting topic classification of the received sentence, transfers the query data to an external server 710' serving a classifier model for topic extraction, and receives response data including topic information extracted by the classifier model from the external server 710'.

The first operator 710 configures a processing result to include the response data received from the external server 710' and transmits the configured processing result to the second operator 720.

The second operator 720 extracts a URL address mapped to the classification result (topic information) included in the processing result transmitted from the first operator 710 from the lookup table, configures a processing result to include the URL address, and transmits the processing result to the last operator 730.

The last operator 730 generates query data using the URL address included in the processing result of the second operator 720 and delivers the query data to the external servers 720' or 730' indicated by the URL address. Here, the external servers 720' and 730' may provide a conversation creation model that predicts a response sentence.

The external servers 720' and 730' configure the response sentence as response data and deliver the response data to the last operator 730, and the last operator 730 returns the response sentence included in the response data to the service client 500 through a response sentence runner 700 included in the response data.

As such, when the service client 500 inputs a sentence, an address of a sentence creation API according to a topic classification result, which is the first operator's query result, is selectively determined, and a response sentence suitable for context of the sentence is created, and the response is returned to the service client 500.

Figure 17:
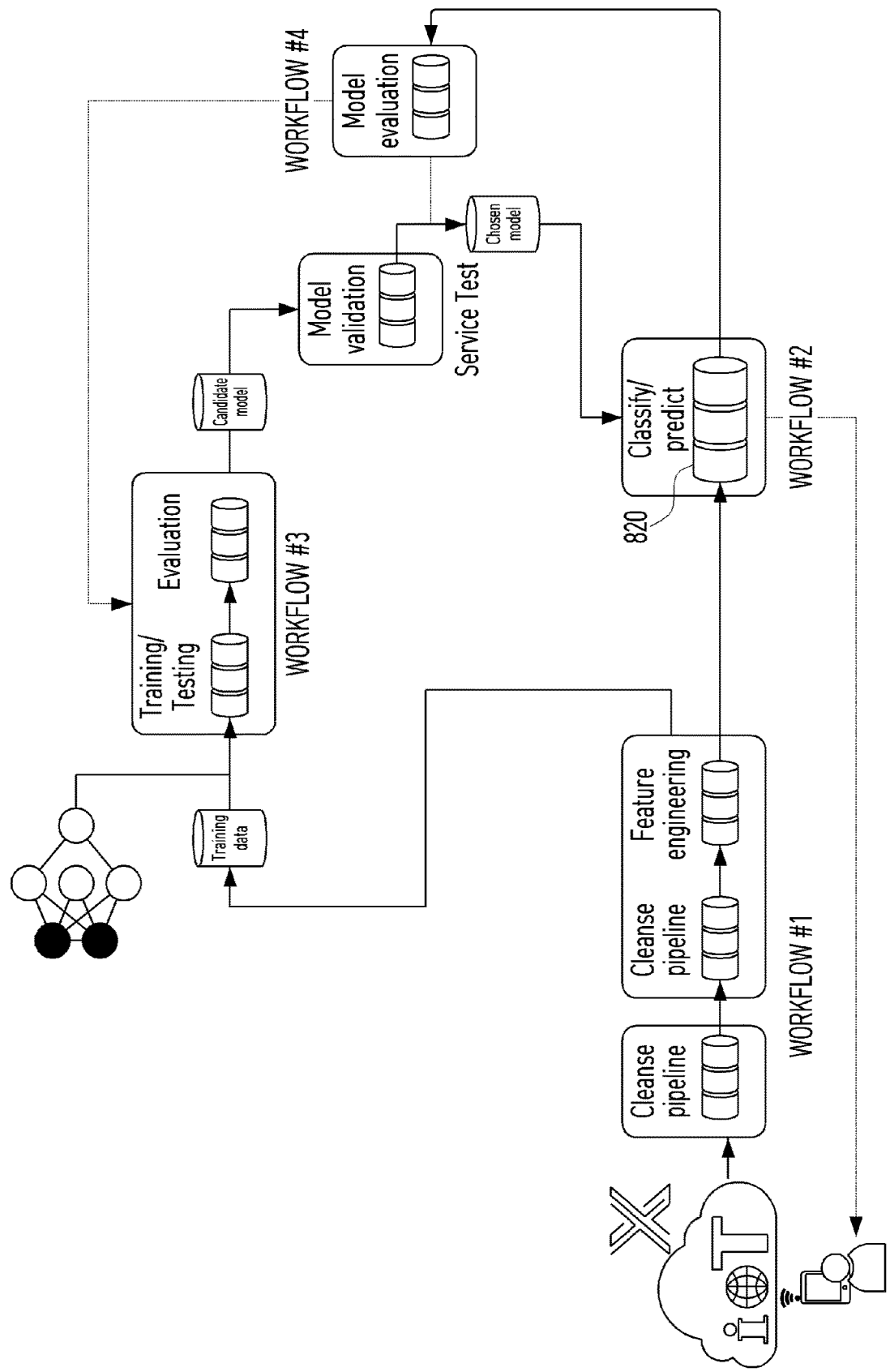
FIG. 17 is a diagram illustrating an orchestration method for executing and controlling one or more workflows for periodically updating a prediction model related to a fusion intelligence service according to an embodiment of the present invention.

FIG. 17 is a diagram illustrating an orchestration method of executing and controlling one or more workflows for periodically updating a prediction model related to a fusion intelligence service according to an embodiment of the present invention.

In the orchestration method of the present invention, a continuous prediction service may be provided by continuously, sequentially, and periodically executing one or more workflow pipelines that updates a served prediction model by processing time-series data in real time and periodically fine-tuning time-series prediction model.

Referring to FIG. 17, workflow #1 for real-time data processing ((①)) is configured. It runs in a framework of a real-time stream method.

Workflow #1 includes an engine for refining data in real time, a real-time stream engine in a mini-batch format that performs feature engineering to create learning data (training data) using the refined data transferred from the engine, and a time-series stream file generating engine for generating the learning data as a file stream.

Workflow #2 for real-time reasoning serving ((②)) include an engine #1 performing interference for prediction by receiving real-time data processed by execution of the workflow #1 in a stream manner and an engine #2 configuring a evaluation data set for evaluating accuracy of prediction results by the engine #1 and creating the evaluation data set in a file stream form.

Engine #2 may select specific prediction results from among the prediction results performed by the engine #1 in various manner and configure the selected specific prediction results as an evaluation data set. The results inferred by engine #1 are output to a stream-only message queue for delivery to the client.

Workflow #3 is a workflow for periodically fine-tuning a prediction model using new data.

The workflow #3 is an engine #1 for extracting time series data for fine-tuning at a specific reference time from a list of real-time streaming files generated by workflow #1, and an engine #2 automatically mapping a ground-truth value of prediction results for verification from the time-series data, a learning engine #3 for fine-tuning a model parameter, and an engine #4 deleting a file temporarily generated for learning.

Workflow #4 periodically performs an evaluation of the prediction service using the evaluation data set generated by the engine #2 of the workflow #2.

This workflow #4 includes an engine #1 extracting the prediction result at a specific time from the evaluation data set generated by the engine #2 of the workflow #2, an engine #2 comparing a label value obtained by labeling the evaluation data set with the prediction result extracted at the specific time and evaluating the same, an engine #3 determining whether to update a prediction model based on the evaluation result, and an engine #4 deleting the evaluation data set after completion of the evaluation.

In the orchestration method, the workflows #1 and #2 are executed together with driving to maintain the real-time streaming processing pipeline for a real-time prediction.

Workflow #3 and #4 are driven at a specific period to fine-tune a learning model from data collected periodically and to periodically evaluate whether or not optimal performance is obtained.

The workflow engine framework for a cross-domain extension according to the present invention may be implemented as a hardware component, a software component, and/or a combination of a hardware component and a software component.

For example, the components described in the embodiments may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of executing and responding to instructions.

The software may include a computer program, a code, an instruction, or any combination thereof and configure a processing device to operate as desired or independently or collectively instruct the processing device.

Software and data may be embodied permanently or temporarily in any type of machine, component, physical or virtual equipment, computer storage medium or device, or in a propagated signal wave so as to be interpreted by a processing device or provide instructions or data to the processing device.

The software also may be distributed to a computer system connected via a network and stored and executed in a distributed fashion. The software and data may be stored in one or more computer readable recording mediums.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A workflow engine framework for a cross-domain extension executed by a computing device including a processor, comprising:
a system configuration unit configured to generate a plurality of engines according to a workflow specification defined by a user; and
a system controller configured to control execution of the plurality of engines,
wherein the plurality of engines comprise a first engine configured to execute a first workflow of a first domain and a second engine configured to execute a second workflow of a second domain, and
wherein the workflow engine framework further comprising:
an application repository configured to transfer a result of processing data performed in the first engine to the second engine to fuse the first domain and the second domain.

2. The workflow engine framework of claim 1, wherein the first engine comprises:
a reader configured to read data from a data starting point, a plurality of unit operators configured to process data read by the reader, and a writer configured to output a processing result, which is a first processing result, processed by the plurality of unit operators to the application repository, and
the second engine comprises:
a reader configured to read the first processing result from the application repository, a plurality of unit operators configured to process the first processing result read by the reader, and a writer configured to output a second processing result processed by the plurality of unit operators to a data destination.

3. The workflow engine framework of claim 1, further comprising:
an application access controller configured to allocate an authority to access the application repository to the first and second engines through an authentication process for the first and second engines.

4. The workflow engine framework of claim 3, wherein the authentication process is an open-authentication-based authentication process.

5. A workflow engine framework for a cross-domain extension executed by a computing device including a processor, comprising:
a system configuration unit configured to generate a plurality of engines according to a workflow specification defined by a user; and
a system controller configured to control execution of the plurality of engines,
wherein the plurality of engines comprise:
first and second engines configured to execute a first workflow of a first domain; and
a third engine configured to execute a second workflow of a second domain,
wherein the workflow engine framework further comprising:
an application repository configured to configure a processing result of the second engine as a processing result of the first workflow and to transfer the processing result to the third engine to fuse the first domain and the second domain.

6. The workflow engine framework of claim 5, wherein
the first engine comprises a first reader configured to read data from a data starting point, a first unit operator configured to process the data read by the first reader, and a first writer configured to output a processing result, which is a first processing result, processed by the first unit operator to an intermediate destination in the first domain, and
the second engine comprises a second reader configured to read the first processing result from the intermediate destination, a second unit operator configured to process the first processing result read by the second reader, and a second writer configured to output a second processing result processed by the second unit operator to the application repository.

7. The workflow engine framework of claim 5, wherein the third engine comprises a third reader configured to read the processing result, which is a second processing result, of the second engine from the application repository, a third unit operator configured to process the second processing result read by the third reader to generate a third processing result, and a third writer configured to output the third processing result to a data destination.

8. The workflow engine framework of claim 5, wherein the second engine is configured to receive a processing result of the first engine,
wherein the workflow engine framework further comprising:
an application access controller configured to allocate an authority to access the application repository to the second and third engines through an authentication process for the second and third engines to fuse the first workflow of the first domain and the second workflow of the second domain.

9. The workflow engine framework of claim 5, wherein the second engine comprises:
a second reader configured to read the first processing result from an intermediate data destination which has received the processing result, which is a first processing result, of the first engine;
a second unit operator configured to filter a file to be moved to a final data destination in a file list included in the first processing result input from the second reader, to convert a file name of the filtered file into a new file name, and to change different directory paths of files included in the file list into a single directory path; and
a second writer configured to move or duplicate the file list processed by the second unit operator and the files included in the file list to the application repository.

10. The workflow engine framework of claim 9, further comprising:
an application access controller configured to verify whether the second writer has an authority to access the application repository.

11. The workflow engine framework of claim 10, wherein the application access controller is configured to perform an open-authentication-based authentication process on the second writer to verify whether the second writer has an authority to access the application repository.

12. A workflow engine framework for a cross-domain extension executed by a computing device including a processor, comprising:
a system configuration unit configured to generate a plurality of engines according to a workflow specification defined by a user; and
a system controller configured to control execution of the plurality of engines,
wherein the plurality of engines comprise a first engine configured to execute a first workflow of a first edge domain in the first edge node, a second engine configured to execute a second workflow of a core domain in a core node, and a third engine configured to execute a third workflow of a second edge domain in a second edge node,
wherein the workflow engine framework further comprising:
a first sharing repository configured to transfer a processing result of data performed in the first engine to the second engine to fuse the first domain and the second domain; and
a second sharing repository configured to transfer a processing result of data performed in the second engine to the third engine to fuse the second domain and the third domain.

13. The workflow engine framework of claim 12, wherein the first engine comprises:
an engine A configured to process data collected from a data starting point; and
an engine B configured to move or duplicate a processing result of the engine A to the first sharing repository to share the processing result of the engine A with the core node.

14. The workflow engine framework of claim 12, wherein the second engine executes the second workflow of performing fine tuning for a learning model using, as training data, a processing result by the first edge node from the first sharing repository.

15. The workflow engine framework of claim 14, wherein the second engine comprises:
an engine A configured to read, as training data, the processing result of the first engine from the first sharing repository;
an engine B configured to perform learning for fine tuning using the training data read by the engine A; and
an engine C configured to move a learning model of a new version generated or updated according to a learning result of the engine B to the second sharing repository.

16. The workflow engine framework of claim 12, wherein the third engine is configured to execute the third workflow of performing a prediction service using a learning model of a new version loaded from the second sharing repository.

17. The workflow engine framework of claim 16, wherein the third engine comprises:
an engine configured to move the learning model of the new version from the second sharing repository to the second edge node; and
a serving engine configured to perform serving to provide a prediction service using the learning model of the new version moved from the second sharing repository.

* * * * *